United States Patent [19]

Chaud et al.

[11] 3,733,488
[45] May 15, 1973

[54] DEVICE FOR INDICATING RAPID RADIOACTIVE CONTAMINATION

[75] Inventors: Andre Chaud, Manosque; David Da Costa Vieira; Georges Friedling, both of Aix en Provence; Henri Suzan, Saint Paul les Durance; Claude Vieuxmaire, Meyrargues, all of France

[73] Assignee: Commissariat A L'Energie Atomique, Paris, France

[22] Filed: May 20, 1971

[21] Appl. No.: 145,404

[52] U.S. Cl. ............................................. 250/83.3 R
[51] Int. Cl. ............................................. G01t 1/16
[58] Field of Search .................. 250/83.3 R, 71.5 R

[56] References Cited

UNITED STATES PATENTS 3,578,960  5/1971  Georgi et al. ............... 250/83.3 R X
3,486,025  12/1969  Brinkerhoff et al. ........... 250/83.3 R Primary Examiner—Archie R. Borchelt
Assistant Examiner—Davis L. Willis
Attorney—Cameron, Kerkam & Sutton

[57] ABSTRACT

The difference in rates of variation in time of useful and spurious signals is employed in order to select the useful signals by means of $n$ detection channels each comprising successively a radioactivity detector, a matching circuit and a scaler, at least one clock signal generator for delivering periodic pulses and a circuit for the distribution of clock signals, a direct measurement channel for recording and comparing the content of each scaler with a threshold value $A'$ in order to provide information when the content exceeds the threshold value, and a "difference" measurement channel which follows the progressive variation of radioactive contamination and comprises a scaler-selection circuit, means for providing a "filtered" value $a_t$ of the content of each scaler, means for comparing the difference between each content and the corresponding "filtered" value with a threshold value $A$ and threshold-overshoot information means.

5 Claims, 1 Drawing Figure

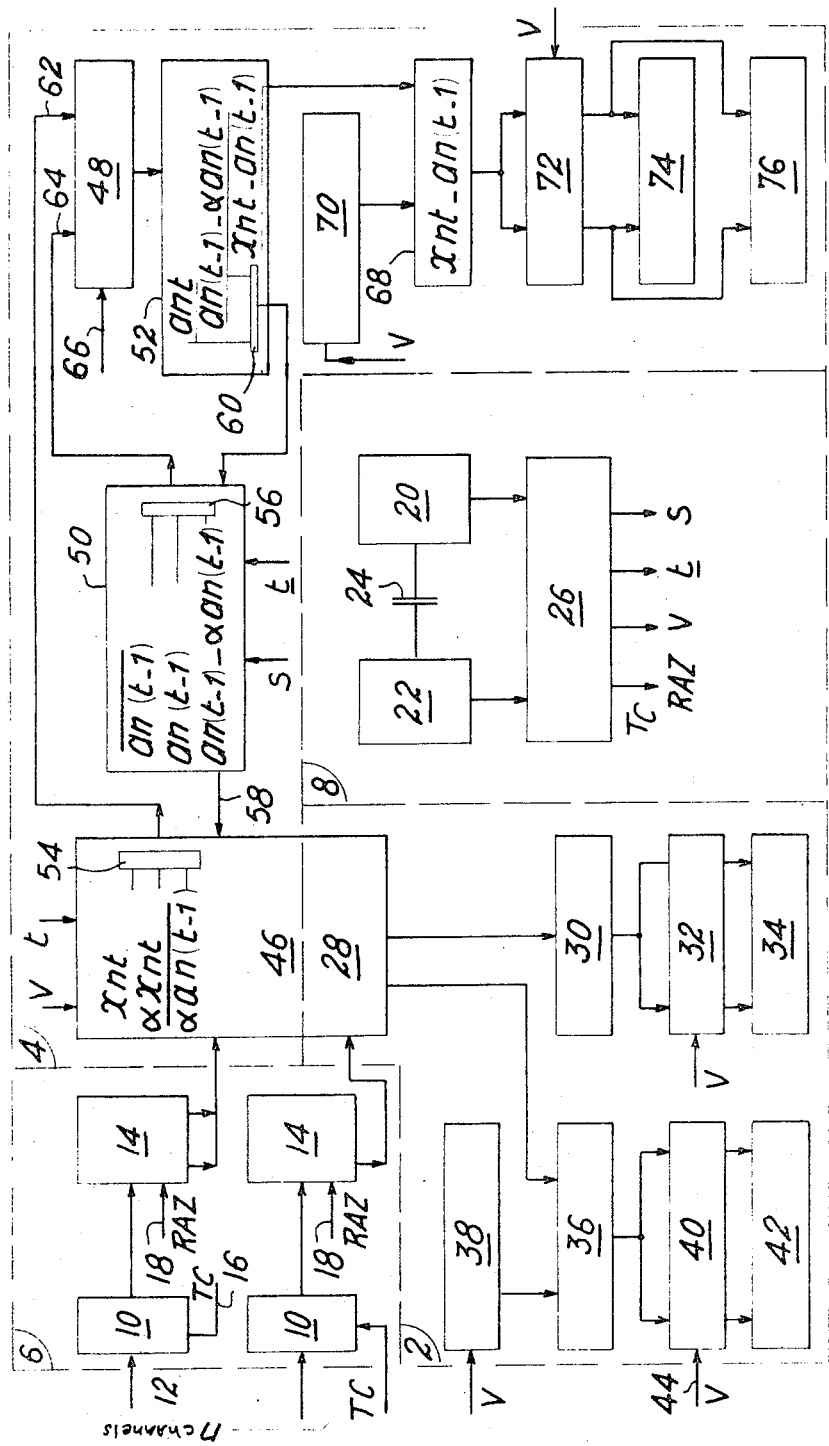

DEVICE FOR INDICATING RAPID RADIOACTIVE CONTAMINATION

This invention relates to a device for indicating rapid radioactive contamination. This apparatus makes it possible by means of pulses delivered by a radioactivity detection unit to detect and to measure very rapidly in a number of different locations at the same time accidental radioactive contamination which arises, for example, from leakage of a radioactive gas contained within a duct or within an enclosure. Such accidental contamination can be detected in the presence of high natural contamination caused, for example, by the presence of decay products of a radioactive substance such as radon. Moreover, this natural contamination is subject to very substantial variations which are liable to amount to a ratio of 1:15 but have a periodicity of 24 hours. Said device may be intended to ensure safety of personnel and must also exhibit high reliability of operation.

A number of solutions have already been employed for detecting accidental radioactive contamination. The solutions differ from each other in the mode of selection of the useful signal (accidental contamination) from the spurious signals (natural contamination) which are liable to conceal said useful signal. For example, it is possible to make use of the difference between radioactive half-periods of useful and spurious signals or alternatively the existence of characteristic time relations of alpha and beta radioactive emissions either of the useful signal or of the spurious signal. It is also possible to carry out the selection of the useful signal by making use of the ratio between the total fluxes of the different emitted particles (for example, the ratio of values of the alpha particle flux to the beta particle flux). However, all these solutions result in constructions which are usually of complex and costly design and which have a substantial response time as well as relatively poor sensitivity.

Another method which has already been employed for selecting the useful signals from the spurious signals consists in utilizing the difference in rates of variation in the time of the useful signal and of the spurious signal. Thus, when the detection is carrier out in the presence of natural contamination resulting from the presence of decay products of radon, the variations in radioactivity of radon have a periodicity of approximately 24 hours whereas accidental contamination can attain a hazardous level within a much shorter period of time. In the apparatus which makes use of this method, means are accordingly employed whereby the progressive variation of a count rate can be followed. To this end, the apparatus is mainly composed of a radioactivity detector which delivers at its output pulses whose number is characteristic of the natural and accidental radioactive contaminations and of two instruments referred-to as counting ratemeters each intended to provide a continuous indication of the mean count rate over a predetermined time interval. These counting ratemeters have different time constants : the first ratemeter which is located immediately downstream of the radioactivity detector has a much shorter time constant than the second ratemeter (the ratio between said time constants can be equal to 1:5, for example). A comparison of the voltages delivered at the output of the two ratemeters makes it possible to follow the progressive variation of the radioactive contamination. However, the integration time constants of the two counting ratemeters are relatively long : by way of indication, the time constant of the second ratemeter is usually within the range of 300 to 1000 secs. In consequence, the alarm signal which results from an accidental contamination appears only when a fairly long time interval has elapsed after initial contamination. Moreover, the apparatus has many adjustment and calibration points which frequently have to be corrected in order to take drift into account.

This invention proposes a device for the rapid indication of radioactive contamination which complies with practical requirements more effectively than comparable devices of the prior art, especially insofar as the apparatus has a very short response time, is very simple to use and permits detection of accidental radioactive contamination at a number of different locations at the same time.

To this end, the invention proposes a device for indicating rapid accidental contamination wherein the useful signals are selected from the spurious signals by utilizing the difference in rates of variation in time of the useful signals and of the spurious signals. Said device is essentially provided with $n$ detection channels each comprising successively a radioactivity detector for delivering said useful and spurious signals, a circuit for matching said signals and a scaler, a common circuit comprising at least one clock-signal generator for delivering periodic pulses and a circuit for the distribution of said clock signals, a direct measuring channel comprising a circuit for selecting said scalers and connected on the one hand to means for recording the content of each scaler and on the other hand to means for comparing the content of each scaler with a threshold value $A'$, the result of the comparison being such as to produce an item of information by suitable means when said content is greater than said threshold value $A'$, and a "difference" measuring channel which serves to follow the progressive variation of the radioactive contamination and comprises a circuit for selecting said scalers, means for providing a "filtered" value $a_t$ of the content of each scaler, means for comparing the difference between each of said contents and said "filtered" value which corresponds thereto with a threshold value $A$ and means for providing information relating to overshoot of said threshold $A$.

A better understanding of the invention will be gained from the following description of one embodiment of the invention which is given by way of non-limitative example. In the accompanying drawings, the single FIGURE to which the description relates is a block diagram of one embodiment of the invention.

The selection of useful signals resulting from detection of accidental radioactive contamination is carried out in the same manner as in the particular device of the prior art which was last mentioned in the foregoing by utilizing the difference in rates of variation in time of the useful signals and of the spurious signals.

The device which is shown in the single FIGURE is subdivided diagrammatically into three portions : a direct measuring channel 2, a "difference" measuring channel 4 and a common portion made up of two circuits 6 and 8.

The circuit 6 has $n$ detection channels which serve to count the pulses delivered by $n$ detectors placed at $n$ different locations. The number $n$ can be of substantial value such as 16, for example. The radioactivity of each of said $n$ locations is measured by means of a radioactivity detector which can consist, for example, of a scintillator associated with a photomultiplier. Each $n$ detection channel comprises a radioactivity detector which is not illustrated in the FIGURE, a circuit 10 for matching the pulses which are emitted by said radioactivity detector and pass at 12 into the matching circuit, and a scaler 14 which is connected to the output of the matching circuit 10. The matching circuit 10 which is a threshold trigger delivers at its output pulses which have the same polarity and the same amplitude in all cases. The pulses derived from the circuit 10 are sent into the scaler 14 for a period of time which is fixed at 10 seconds but which can be adapted to the range of recurrence frequency of the emitted pulses. Counting is stopped for approximately 10 msecs in order that the contents of the scalers may be processed. To this end, the output of the matching circuit 10 is constituted by a gate having two inputs which permits transmission of pulses for a period of 10 secs and prevents transmission for the following period of 10 msecs. The signal which permits pulse-transmission and is referred-to as $Tc$ passes into the circuit 10 at 16. After each count, all the scalers 14 are reset by means of a reset signal RAZ which passes into the scaler 14 at 18. The second circuit 8 of the common portion is constituted by two clock-signal generators 20 and 22 which are coupled to each other through a capacitor 24 and a circuit 26 for the distribution of clock signals. A single clock-signal generator could have been employed and it is for reasons of operational safety and reliability of the apparatus that the clock-signal generator has been duplicated.

The clock-signal distribution circuit 26 delivers different signals : $Tc$, which is employed for fixing the counting time of the scalers, RAZ for resetting the scalers, V which serves to select one of the $n$ detection channels, $t$ which determines the times of calculation in the "difference" measuring channel and S for the selection of the different storage device which are employed in the "difference" measuring channel. The circuit 26 for generating and distributing clock signals mainly comprises an oscillator constituted by an amplifier which drives a series of flip-flops mounted as a divider by 8 followed by a divider by $n$. The outputs of these dividers are connected to decoders. The decoders which are connected to the divider by $n$ deliver $n$ signals V which are employed for selecting one of the detection channels. Each signal V which has a duration of approximately 500 $\mu$secs is divided into eight signals $t$ referred-to as calculation time signals. Moreover, the circuit 26 delivers the signals S for selecting storage devices, this selection being carried out in lines and columns, by means of a combination of gates and inverters for carrying out OR-functions.

The matching circuits 10 and the scalers 14 receive the signals Tc and RAZ from the two clock-signal generators 20 and 22 by means of a circuit which carries out the OR-function. Furthermore, the clock-signal generator 20 initiates production of the signals employed for the "difference" measuring channel and the clock-signal generator 22 initiates production of the signals employed for the direct measuring channel. Thus, in the event of failure of one of the two clock-signal generators, the circuit 6 is always supplied by the clock-signal generator which operates correctly and one of the two measuring channels 2 and 4 continues to operate normally.

The direct measuring channel 2 results on the one hand in the recording of $n$ voltages which are proportional to the count rate of each radioactivity detector $n$ and on the other hand in providing threshold-overshoot information relating to the number of pulses counted by each radioactivity detector. To this end, the direct measuring channel 2 is composed of a scaler selecting circuit 28 which makes it possible to direct the content of each scaler successively on the one hand to a digital comparator and on the other hand to a digital-analog converter. The two groups of outputs of the selecting circuit 28 are connected to two separate portions. The first portion is constituted by a digital-analog converter 30 which converts the contents of each scaler 14 into a direct-current voltage which is proportional to the count rate of the radioactivity detector, $n$ capacitor storage devices 32 having $n$ inputs connected to the outputs of the digital-analog converter 30 and $n$ outputs connected to means 34 for recording the contents of each $n$ storage device 32. The converter 30 which makes use of a R/2R network controlled by field-effect transistors provides for automatic switching of two ranges in a ratio of 1:10 in order to permit of more accurate reading of low count rates while providing a substantial dynamic range. The converter operates on the ten bits which have the highest weights and this proves to be sufficient, taking into account the degree of precision which is contemplated.

In order to store the value of the direct-current voltage which results from the digital-analog conversion, the switching properties of the field-effect transistors which are controlled by means of their "gate" electrode are employed before driving the $n$ recording channels. The output voltage of the digital-analog converter 30 is transmitted to the "drain" electrodes of $n$ field-effect transistors, the "source" electrode of each transistor being connected to a "memory" or "storage" capacitor of substantial value. The voltage developed across the terminals of the capacitor is transmitted to a recording channel through an amplifier which has a very high input impedance. The "gate" electrode of each field effect transistor is controlled by the detection-channel identification signals V. A recording in analog form of the count rate which is measured at 10-second intervals is thus made available. Between two measurements, the preceding result is stored and recorded graphically.

In the second portion of the direct measuring channel, the content of each scaler is compared with a threshold value A' which can be different from one detection channel to the next. The comparison is carried out within a digital comparator 36 and this achieves a degree of precision and reliability of operation which are superior to those of an analog comparator ; one of the two inputs of said comparator 36 is connected to one of the two outputs of the scaler-selecting circuit 28, the second input of the comparator being connected to the output of a circuit 38 for selecting the indicated threshold A'. The comparison is carried out $n$ times and in fact a number of times corresponding to the number of scalers to be scanned. The $n$ comparisons are carried out at intervals of 10 msecs and this cycle is repeated at ten-second intervals. In order to retain the information in each detection channel between two comparisons, use is made of an assembly of $n$ storage devices 40 whose inputs are connected to the output of the comparator 36. The output of each of said $n$ storage devices controls by means of a transistor which is not shown in the drawings n means 42 for providing information relating to overshoot of the threshold value A'. By way of example, said means can consist of warning indicator lamps which are located on the front face of the apparatus. Said threshold-overshoot information can also be taken from the apparatus by means of a connection for subsequent operation of alarm systems which are located outside the apparatus.

The signals V for identification of the detection channel numerals are applied to the input 44 of the assembly of n storage devices 40.

The object of the "difference" measuring channel 4 is to provide a "filtered" value $a_t$ of the content of each scaler 14 and to compare the difference between the result of the direct count and of the "filtered" count at an indicated threshold value A for the purpose of triggering an alarm when said difference oversteps the threshold value A which is a significant value of evolution of the radioactive contamination. This filtering is obtained by means of a numerical method. The "filtered" value $a_t$ of the content of a scaler 14 is given by the following relation:

$$a_t = \alpha x_t + a_{t-1} - \alpha a_{t-1} \text{ with } 0 < \alpha < 1$$

wherein $x_t$ represents the content of the scaler, $a_{t-1}$ represents the "filtered" value of the content of the scaler at the time of the preceding measurement and wherein $\alpha$ represents the existence of a time constant; the relation between said time constant $\pi$, the coefficient $\alpha$ and the sampling period $T$ is: $(1-\alpha) = e - T/\pi$; if $\alpha = 0$, $a_t = a_{t-1}$, the time constant is infinite; if $\alpha = 1$, $a_t = x_t$, then the time constant is zero; in this case, $\alpha$ is a number which is chosen so as to have a small value equal to $2^{-y}$, $y$ being a whole number. To select $\alpha$ essentially consists in determining an integration time constant if $\alpha$ is chosen equal to $2^{-7}$ with a measurement period equal to 10 secs, this integration time constant is approximately 1000 secs. By reason of its form, multiplication by $\alpha$ corresponds to division by a power of 2. In practice, this multiplication can therefore be performed only by displacement of the binary information by a number of bits which is equal to the exponent $y$.

The calculations which result in the "filtered" value $a_t$ and in processing of this latter are repeated $n$ times, that is, a number of times corresponding to the number of detection channels. At the end of each counting and measuring cycle, the scalers are reset by means of the signal RAZ. The calculations of $a_{t-1}$ and of the difference $(x_t - a_{t-1})$ are performed by means of an adder which is driven on the one hand by a scaler-selection circuit and on the other hand by an assembly of storage devices.

The "difference" measuring channel 4 comprises in the first place a scaler-selection circuit 46 having $n$ inputs, each input being connected to the output of a scaler 14, an adder 48 having two inputs, one input 62 being connected to the output of the scaler-selection circuit 46 and the other input 64 being connected to an assembly 50 of $n$ storage devices. The output of the adder 48 is connected to one of the inputs of the storage assembly 50 by means of a buffer register 52. The scaler-selection circuit 46 supplies to the adder 48 by means of an OR-circuit 54 which is incorporated with the circuit 46 the values $x_{nt}$, $\alpha x_{nt}$ and $\overline{\alpha\, a_{n)(t-1)}}$; the value just given represents the complement of $\alpha\, a_{n)(t-1)}$. The other input 64 of the adder 48 receives by means of an OR-circuit 56 which is incorporated with the assembly 50 the values $\overline{a_{n)(t-1)}}$, $a_{n)(t-1)}$ and the difference $(a_{n)(t-1)} - \alpha\, a_{n)(t-1)})$. The assembly of storage devices 50 supplies to the scaler-selection circuit 46 the value $\overline{\alpha\, a_{n)(t-1)}}$ at the output 58 of said assembly. The output of the $\alpha$ register 52 which is connected to the storage assembly 50 supplies to this latter by means of an OR-circuit 60 which forms the output of the register 52 the values $a_{nt}$ and $(a_{n)(t-1)} - \alpha\, a_{n)(t-1)})$.

A sequence of calculations is carried out in a number of steps at the successive times $t_0$ to $t_5$. These steps are as follows:

First step at the time interval $t_0$:

The content $x_t$ of the scaler 14 of the processed detection channel is presented by the scaler-selection circuit 42 at the input 62 of the adder 48. The complement $\overline{a_{t-1}}$ of the filtered value $a_{t-1}$ is presented at the input 64 of the adder 48. A signal having a logical level "1" is applied to the "retention" input 66 of the adder 48 in order to perform a subtraction. The subtraction $(x_t - a_{t-1})$ is performed. The result is recorded in the buffer register 52.

Second step at the time $t_1$:

A comparator 68 which continuously receives the signals derived from the adder 48 is permitted to deliver a signal at its output if the difference $(x_t - a_{t-1})$ is higher than a threshold value A which is pre-indicated in a circuit 70 for selecting the threshold A; this value can be different from one detection channel to the next. The result is stored in a group 72 of $n$ storage devices and may subsequently give rise to the appearance of a threshold-overshoot information in the circuit 74. This threshold-overshoot information relating to the threshold A can be represented, for example, by lighting-up of a warning indicator lamp. This state is maintained until the corresponding sequence of the following cycle. The threshold overshoot which may subsequently occur is recorded in the case of each channel in a recorder 76.

Third step at the time $t_2$:

$\alpha\, a_{t-1}$ (complement of the "filtered" value $a_{t-1}$ multiplied by $\alpha$) is presented at the input 62 of the adder 48 by means of the scaler-selection circuit 46. Thie information is obtained via the output 58 of the storage assembly 50 from $a_{t-1}$ contained in the storage assemblies 50 and displaced by Y bits towards the right-hand side; in other words, the input of lowest weight of the adder 48 will receive the bit of the order $(y+1)$ starting from the lowest weight contained in the storage devices 50. The "filtered" value $a_{t-1}$ is presented at the input 64 of the adder 48. A signal having the logical level "1" is applied to the input 66 of the adder 48 since it is necessary to perform a subtraction. The subtraction $(a_{t-1} - \alpha\, a_{t-1})$ is performed. The result is recorded in the buffer register 52.

Fourth step at the time $t_3$:

The result $(a_{t-1} - \alpha\, a_{t-1})$ which is stored in the buffer register 52 is placed in storage assembly 50.

Fifth step at the time $t_4$:

$\alpha x_t$ is presented at the input 62 of the adder 48 by means of the scaler-selection circuit 46. This information is derived from $x_t$ which is contained in the scaler 14 of the detection channel considered as displaced by $y$ bits towards the right (that is, the input of lowest weight of the adder 48 will receive the bit having the order $(y+1)$ starting from the lowest weight contained in the scaler 14). The difference $(a_{t-1} - \alpha\, a_{t-1})$ contained in the storage assembly 50 is presented at the input 64 of the adder 48. The addition $$\alpha x_t + (a_{t-1} - \alpha a_{t-1}) = a_t$$

is performed. The result is recorded in the buffer register 52.

Sixth step at the time $t_5$ :

The preceding result $a_t$ which has been stored in the buffer register 52 is placed in the storage assembly 50 for the purpose of utilization in the following calculation cycle.

As each measuring cycle takes place (at 10-second intervals), the calculations described in the previous steps are performed $n$ times, namely once per detection channel, and result in the appearance of threshold-overshoot information, namely one datum per detection channel in the case in which the "filtered" evolution of the contamination oversteps the threshold A which can be adjusted separately in the case of each detection channel. Moreover, the threshold-overshoot detection channel is indicated in a recorder 76. Should the radioactive contamination again become normal, the threshold-overshoot information disappears automatically (the warning indicator lamps being turned off, for example) and only the recording provides an indication of any overshoot.

The device hereinabove described therefore makes it possible to follow on the one hand by means of the direct measuring channel the evolution or progressive variation of the radioactive contamination and on the other hand by means of the "difference" measuring channel the "filtered" evolution of said contamination. In devices of the prior art, the signals delivered by the radioactivity detectors were processed in analog form whereas, in accordance with the present invention, said signals are processed in digital form in the "difference" measuring channel 4. This makes it possible in particular to have an apparatus which exhibits a much faster response time. The cost of manufacture of the device herein described is relatively low, all the more so as it permits the possibility of processing up to $n$ measuring channels by making use of the same calculation components for each detection channel by virtue of the scaler-selection circuits 46. The apparatus is of small overall size and achieves a high standard of operational safety and reliability. Precision of measurements is considerably greater than that which is obtained by means of devices of the prior art. In particular, the response time is very short since calculations are carried out at ten-second intervals.

What we claim is :

1. A device for indicating rapid radioactive contamination wherein the useful signals are selected from the spurious signals by utilizing the difference in rates of variation in time of the useful signals and of the spurious signals, wherein said device has $n$ detection channels each comprising successively a radioactivity detector for delivering said useful and spurious signals, a circuit for matching said signals and a scaler, a common circuit comprising at least one clock-signal generator for delivering periodic pulses and a circuit for the distribution of said clock signals, a direct measurement channel comprising a circuit for selecting said scalers which is connected on the one hand to means for recording the content of each scaler and on the other hand to means for comparing the content of each scaler with a threshold value A', the result of the comparison being such as to produce an information signal by suitable means when said content is greater than said threshold value A', and a "difference" measurement channel which serves to follow the progressive variation of the radioactive contamination and comprises a circuit for selecting said scalers, means for providing a "filtered" value $a_t$ of the content of each scaler, means for comparing the difference between each of said contents and said "filtered" value which corresponds thereto with a threshold value A and means for providing information relating to overshoot of said threshold A.

2. A device according to claim 1, wherein said means for recording the content of each scaler by means of the direct measurement channel comprise a digital-analog converter, $n$ storage devices whose inputs are connected to the output of said converter and means having $n$ inputs for recording the $n$ items of information which are stored in said storage devices, each $n$ storage device being associated with one of the $n$ inputs of the recording means.

3. A device according to claim 1, wherein said means for comparing the content of each scaler with a threshold value A' comprises a comparator having two inputs, one input being connected to the output of the scaler-selection circuit and the other input being connected to the output of a circuit for selecting the threshold which can be pre-set at a value A' which is variable in the case of each detection channel, $n$ storage devices connected to the output of said comparator and $n$ means for providing information relating to overshoot of said threshold A', one of said storage devices being associated with each of said means.

4. A device according to claim 1, wherein said means for providing a "filtered" value $a_t$ of the content of each scaler comprise an assembly having two outputs of $n$ storage devices, one output being connected to said circuit for selecting the scalers of the "difference" measurement channel and the other output being connected to one of the two inputs of an adder, the other input being connected to the output of said scaler-selection circuit, a buffer register whose input is connected to the output of said adder, one of the two outputs of said register being connected to the input of said assembly of $n$ storage devices and the other output being connected to said means for effecting a comparison of said "difference" measurement channel, and the value $a_t$ of said filtered value being given by the relation :

$$a_t = a_{t-1} + \alpha (x_t - a_{t-1})$$

wherein $x_t$ represents the content of one of said scalers, $a_{t-1}$ represents the value of said filtered value which results from the preceding count and $\alpha$ represents an arbitrarily selected number which is equal to $2^{-y}$, $y$ being a whole number.

5. A device according to claim 1 including two clock-signal generators which are coupled to each other and one of which delivers clock signals to said direct measurement channel whilst the other delivers signals to said "difference" measurement channel.

* * * * *